United States Patent
Lin et al.

(10) Patent No.: US 11,074,678 B2
(45) Date of Patent: Jul. 27, 2021

(54) BIASING A NOISE FILTER TO PRESERVE IMAGE TEXTURE

(71) Applicant: Apple Inc., Cupertino, CA (US)

(72) Inventors: Sheng Lin, San Jose, CA (US); Wu Cheng, Millbrae, CA (US); Maxim Smirnov, Wilsonville, OR (US)

(73) Assignee: Apple Inc., Cupertino, CA (US)

( * ) Notice: Subject to any disclaimer, the term of this patent is extended or adjusted under 35 U.S.C. 154(b) by 216 days.

(21) Appl. No.: 16/393,892

(22) Filed: Apr. 24, 2019

(65) Prior Publication Data
US 2020/0342579 A1 Oct. 29, 2020

(51) Int. Cl.
*G06T 5/20* (2006.01)
*G06T 5/00* (2006.01)
*G06T 7/50* (2017.01)

(52) U.S. Cl.
CPC .............. *G06T 5/20* (2013.01); *G06T 5/002* (2013.01); *G06T 7/50* (2017.01); *G06T 2207/10024* (2013.01); *G06T 2207/20028* (2013.01); *G06T 2207/20192* (2013.01)

(58) Field of Classification Search
CPC .. G06T 5/20; G06T 5/002; G06T 7/50; G06T 2207/20192; G06T 2207/10024; G06T 2207/20028
See application file for complete search history.

(56) References Cited

U.S. PATENT DOCUMENTS

| 7,373,013 | B2 | 5/2008 | Anderson |
| 8,760,465 | B2 | 6/2014 | Frank et al. |
| 2007/0165962 | A1* | 7/2007 | Smirnov ............... G06T 5/20 382/260 |
| 2012/0308153 | A1 | 12/2012 | Hwang |

FOREIGN PATENT DOCUMENTS

WO   WO 2018/149995 A1   8/2018

OTHER PUBLICATIONS

Zhang, Buyue, and Jan P. Allebach. "Adaptive bilateral filter for sharpness enhancement and noise removal." IEEE transactions on Image Processing 17.5 (2008): 664-678. (Year: 2008).*

* cited by examiner

*Primary Examiner* — Vu Le
*Assistant Examiner* — Tracy Mangialaschi
(74) *Attorney, Agent, or Firm* — Fenwick & West LLP (57) ABSTRACT

Embodiments relate to biasing an image noise filter to reduce edge and texture blurring of image data. Pixel values used to determine photometric coefficients for a bilateral filter are modified by offset values. The offset value for a pixel value is determined by applying a high pass filter to the pixel (referred to as the center pixel) and neighboring pixels of the center pixel. By adding the offset value to the center pixel value, the pixel value difference between the neighboring pixels and the center pixel becomes smaller for pixels on the same side of an edge as the center pixel. Thus, pixels on the same side of the edge get more weight in the bilateral noise filter. Conversely, pixels on the opposite side of the edge as the center pixel get less weight in the bilateral filter. As a result, the biased bilateral filter reduces blurring of edges and increases preservation of texture in the image data.

20 Claims, 7 Drawing Sheets

BIASING A NOISE FILTER TO PRESERVE IMAGE TEXTURE

BACKGROUND

1. Field of the Disclosure

The present disclosure relates a circuit for processing images and more specifically to biasing an image noise filter to reduce edge and texture blurring of image data.

2. Description of the Related Arts

Image data captured by an image sensor or received from other data sources is often processed in an image processing pipeline before further processing or consumption. For example, raw image data may be corrected, filtered, or otherwise modified before being provided to subsequent components such as a video encoder. To perform corrections or enhancements for captured image data, various components, unit stages or modules may be employed.

Such an image processing pipeline may be structured so that corrections or enhancements to the captured image data can be performed in an expedient way without consuming other system resources. Although many image processing algorithms may be performed by executing software programs on central processing unit (CPU), execution of such programs on the CPU would consume significant bandwidth of the CPU and other peripheral resources as well as increase power consumption. Hence, image processing pipelines are often implemented as a hardware component separate from the CPU and dedicated to performing one or more image processing algorithms.

Image processing pipelines often include filters to reduce noise in image data. However, noise filters often blur edges and texture, thus degrading the overall quality of the image data.

SUMMARY

Embodiments relate to an image processor that includes an offset calculator circuit and a center pixel modifier circuit that is coupled to the offset calculator circuit. The offset calculator circuit receives pixel values for a block of original pixels in an image data. The block of original pixels includes a center pixel and neighboring pixels within a predetermined distance from the center pixel. The offset calculator circuit applies a high pass filter to pixel values of the block of original pixels to generate an offset value for the center pixel. The center pixel modifier circuit adjusts a pixel value of the center pixel by the offset value to generate a modified pixel value for a modified pixel. The modified pixel becomes part of a modified pixel block that includes the modified pixel value and the neighboring pixels. The modified pixel block is processed to determine photometric distances of a bilateral filter that preserves texture in the image data.

In some embodiments, the image processor also includes a pixel block assembler circuit and a photometric distance calculator circuit. The pixel block assembler circuit is coupled to the center pixel modifier circuit and the photometric distance calculator circuit is coupled to the pixel block assembler circuit. The pixel block assembler circuit assembles the modified pixel block by including at least the modified pixel value as a pixel value for one of the pixels in the block of modified pixels. The photometric distance calculator circuit receives the modified pixel block and determines photometric distances of pixel values in the modified pixel block. The photometric distance calculator circuit also determines photometric coefficients by processing the photometric distances. In some embodiments, the image processor also includes a bilateral filter circuit coupled to the photometric distance calculator circuit. The bilateral filter circuit performs bilateral filtering by at least multiplying one of the photometric coefficients derived from the photometric distances, a corresponding spatial coefficient of the block of original pixels, and a pixel value of a corresponding pixel in the block of original pixels.

In some embodiments, the offset calculator circuit includes a clipping circuit configured to set the offset value as a first value if the offset value is above the first value and set the offset value as a second value if the offset value is below the second value. In some embodiments, the first value and the second value are programmed into a look up table.

In some embodiments, the block of original pixels is a 5×5 block of pixels.

In some embodiments, the high pass filter is a Laplacian high pass filter.

In some embodiments, the high pass filter is a Laplacian of Gaussian high pass filter.

In some embodiments, the image data is luminance image data.

In some embodiments, the image data is one of red, blue, or green image data.

BRIEF DESCRIPTION OF THE DRAWINGS

Figure (FIG. 1 is a high-level diagram of an electronic device, according to one embodiment FIG. 2 is a block diagram illustrating components in the electronic device, according to one embodiment.

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure relate to biasing a noise filter to reduce edge and texture blurring of image data. In bilateral filtering, photometric coefficients of a photometric kernel (also referred to as range kernel) and spatial coefficients of a spatial kernel are multiplied by pixel values from a set of image data. The noise filter modifies pixel values by offset values to determine photometric coefficients of a bilateral noise filter. The offset value is obtained by applying a high pass filter to a block of pixels including the pixel for modification as the center pixel. The offset value may be positive if the center pixel of the block is on the brighter side of an edge. The offset value may be negative if the center pixel is on the darker side of the edge. By adding the offset value to the center pixel value, the pixel value difference between neighboring pixels and the center pixel becomes smaller for pixels on the same side of the edge as the center pixel. Thus, pixels on the same side of the edge get more weight in the bilateral noise filter. Conversely, pixels on the opposite side of the edge as the center pixel get less weight in the bilateral filter. As a result, the biased bilateral filter reduces blurring of edges and increases preservation of texture in the image data.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, Calif. Other portable electronic devices, such as wearables, laptops or tablet computers, are optionally used. In some embodiments, the device is not a portable communications device, but is a desktop computer or other computing device that is not designed for portable use. In some embodiments, the disclosed electronic device may include a touch sensitive surface (e.g., a touch screen display and/or a touch pad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

Figure 1:
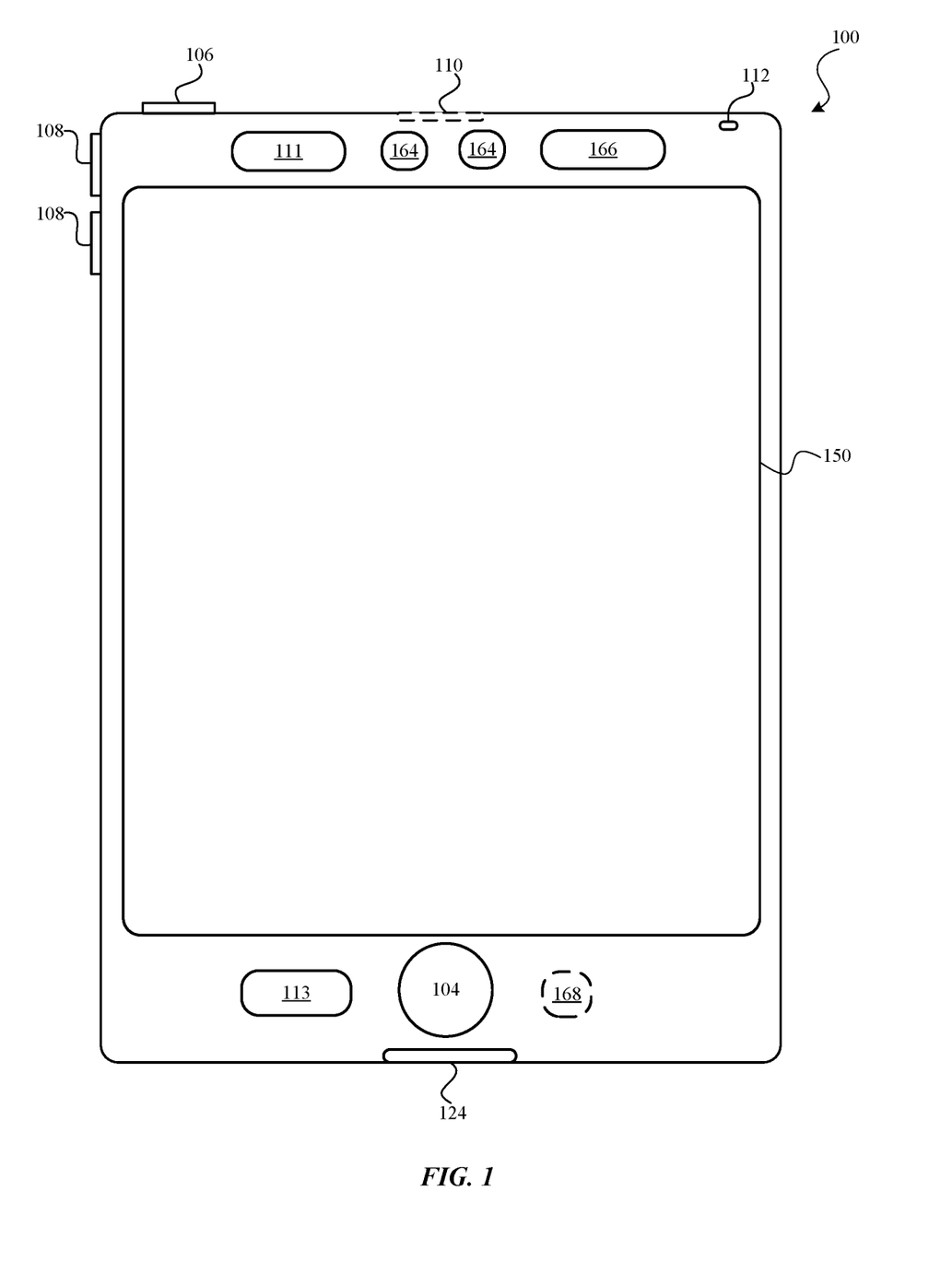

Figure (FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. The device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. Device 100 may include more than one type of image sensors 164. Each type may include more than one image sensor 164. For example, one type of image sensors 164 may be cameras and another type of image sensors 164 may be infrared sensors that may be used for face recognition. Additionally or alternatively, the image sensors 164 may be associated with different lens configuration. For example, device 100 may include rear image sensors, one with a wide-angle lens and another with as a telephoto lens. The device 100 may include components not shown in FIG. 1 such as an ambient light sensor, a dot projector and a flood illuminator.

Device 100 is only one example of an electronic device, and device 100 may have more or fewer components than listed above, some of which may be combined into a component or have a different configuration or arrangement. The various components of device 100 listed above are embodied in hardware, software, firmware or a combination thereof, including one or more signal processing and/or application specific integrated circuits (ASICs). While the components in FIG. 1 are shown as generally located on the same side as the touch screen 150, one or more components may also be located on an opposite side of device 100. For example, the front side of device 100 may include an infrared image sensor 164 for face recognition and another image sensor 164 as the front camera of device 100. The back side of device 100 may also include additional two image sensors 164 as the rear cameras of device 100.

Figure 2:
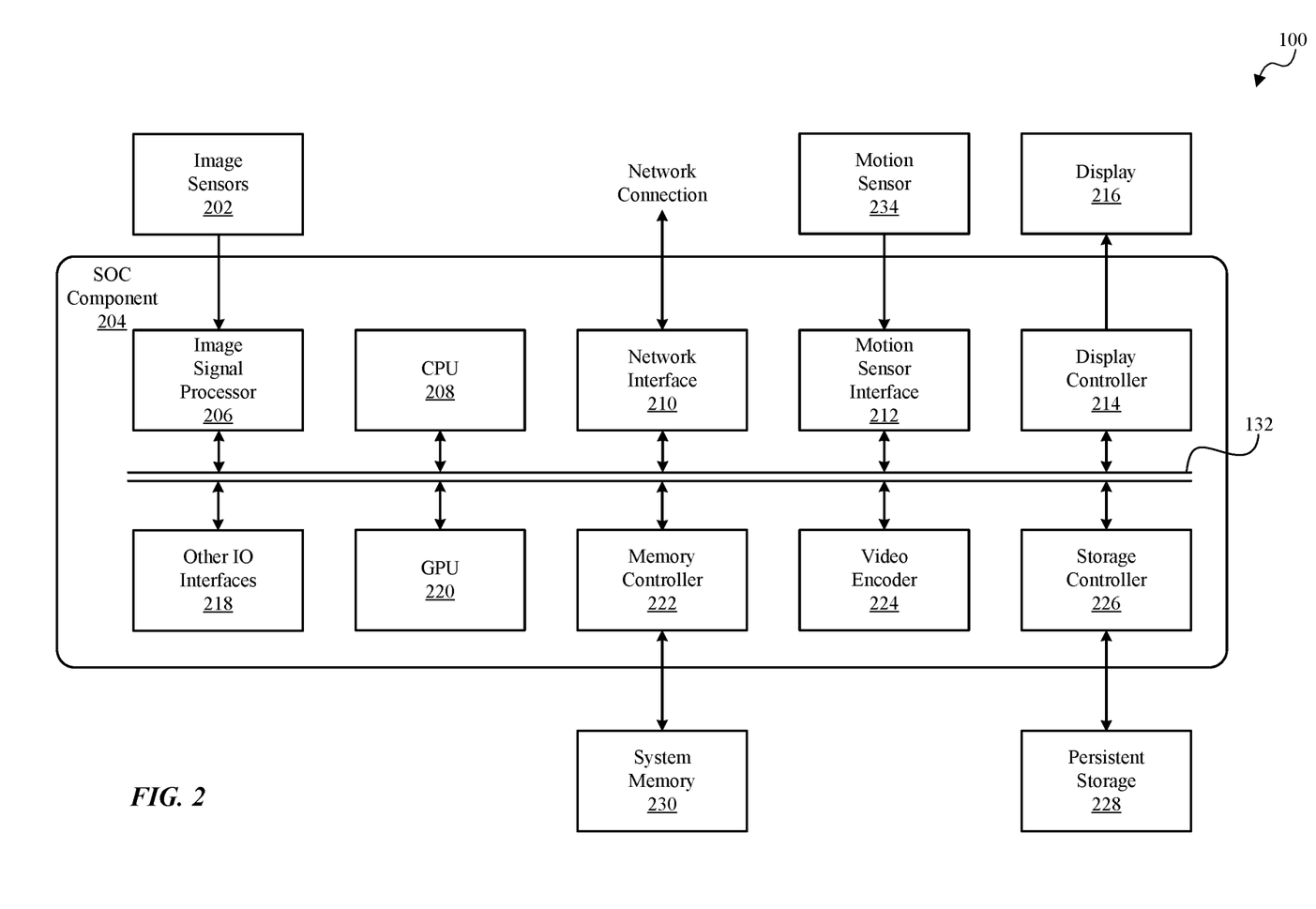

FIG. 2 is a block diagram illustrating components in device 100, according to one embodiment. Device 100 may perform various operations including image processing. For this and other purposes, the device 100 may include, among other components, image sensor 202, system-on-a chip (SOC) component 204, system memory 230, persistent storage (e.g., flash memory) 228, orientation sensor 234, and display 216. The components as illustrated in FIG. 2 are merely illustrative. For example, device 100 may include other components (such as speaker or microphone) that are not illustrated in FIG. 2. Further, some components (such as orientation sensor 234) may be omitted from device 100.

Image sensors 202 are components for capturing image data. Each of the image sensors 202 may be embodied, for example, as a complementary metal-oxide-semiconductor (CMOS) active-pixel sensor, a camera, video camera, or other devices. Image sensors 202 generate raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensors 202 may be in a Bayer color filter array (CFA) pattern (hereinafter also referred to as "Bayer pattern"). An image sensor 202 may also include optical and mechanical components that assist image sensing components (e.g., pixels) to capture images. The optical and mechanical components may include an aperture, a lens system, and an actuator that controls the focal length of the image sensor 202.

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light emitting diode (OLED) device. Based on data received from SOC component 204, display 116 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof. In some embodiments, system memory 230 may store pixel data or other image data or statistics in various formats.

Persistent storage 228 is a component for storing data in a non-volatile manner. Persistent storage 228 retains data even when power is not available. Persistent storage 228 may be embodied as read-only memory (ROM), flash memory or other non-volatile random access memory devices.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, motion sensor interface 212, display controller 214, graphics processor (GPU) 220, memory controller 222, video encoder 224, storage controller 226, and various other input/output (I/O) interfaces 218, and bus 232 connecting these subcomponents. SOC component 204 may include more or fewer subcomponents than those shown in FIG. 2.

ISP 206 is hardware that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations, as described below in detail with reference to FIG. 3.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing operations on graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

I/O interfaces 218 are hardware, software, firmware or combinations thereof for interfacing with various input/output components in device 100. I/O components may include devices such as keypads, buttons, audio devices, and sensors such as a global positioning system. I/O interfaces 218 process data for sending data to such I/O components or process data received from such I/O components.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206, such as discussed below in FIG. 3) and display. The networks may include, but are not limited to, Local Area Networks (LANs) (e.g., an Ethernet or corporate network) and Wide Area Networks (WANs). The image data received via network interface 210 may undergo image processing processes by ISP 206.

Motion sensor interface 212 is circuitry for interfacing with motion sensor 234. Motion sensor interface 212 receives sensor information from motion sensor 234 and processes the sensor information to determine the orientation or movement of the device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 128 or for passing the data to network interface w10 for transmission over a network to another device.

In some embodiments, one or more subcomponents of SOC component 204 or some functionality of these subcomponents may be performed by software components executed on ISP 206, CPU 208 or GPU 220. Such software components may be stored in system memory 230, persistent storage 228 or another device communicating with device 100 via network interface 210.

Image data or video data may flow through various data paths within SOC component 204. In one example, raw image data may be generated from the image sensors 202 and processed by ISP 206, and then sent to system memory 230 via bus 232 and memory controller 222. After the image data is stored in system memory 230, it may be accessed by video encoder 224 for encoding or by display 116 for displaying via bus 232.

In another example, image data is received from sources other than the image sensors 202. For example, video data may be streamed, downloaded, or otherwise communicated to the SOC component 204 via wired or wireless network. The image data may be received via network interface 210 and written to system memory 230 via memory controller 222. The image data may then be obtained by ISP 206 from system memory 230 and processed through one or more image processing pipeline stages, as described below in detail with reference to FIG. 3. The image data may then be returned to system memory 230 or be sent to video encoder 224, display controller 214 (for display on display 216), or storage controller 226 for storage at persistent storage 228.

Example Image Signal Processing Pipelines

Figure 3:
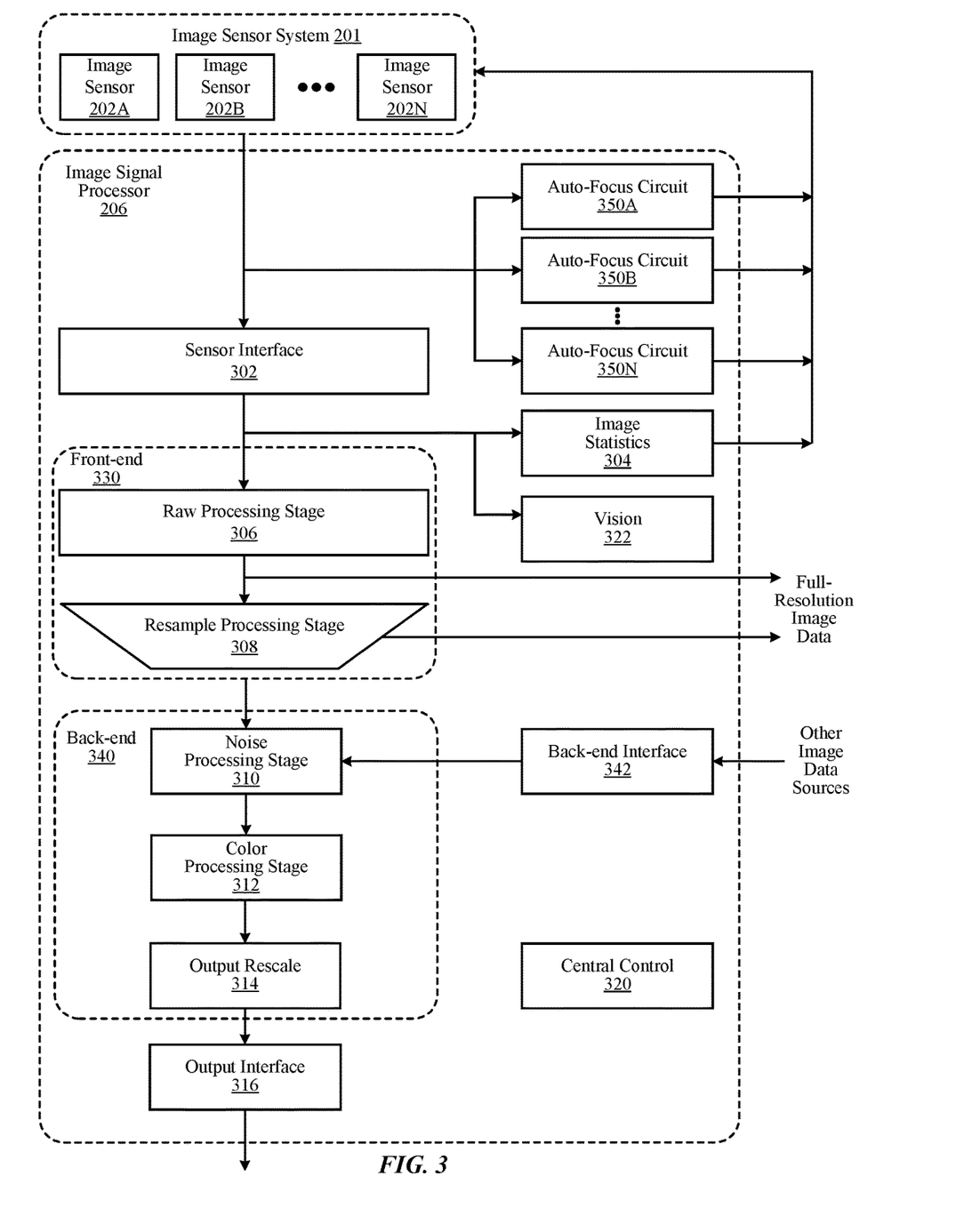
FIG. 3 is a block diagram illustrating image processing pipelines implemented using an image signal processor, according to one embodiment.

FIG. 3 is a block diagram illustrating image processing pipelines implemented using ISP 206, according to one embodiment. In the embodiment of FIG. 3, ISP 206 is coupled to an image sensor system 201 that includes one or more image sensors 202A through 202N (hereinafter collectively referred to as "image sensors 202" or also referred individually as "image sensor 202") to receive raw image data. The image sensor system 201 may include one or more sub-systems that control the image sensors 202 individually. In some cases, each image sensor 202 may operate independently while, in other cases, the image sensors 202 may share some components. For example, in one embodiment, two or more image sensors 202 may be share the same circuit board that controls the mechanical components of the image sensors (e.g., actuators that change the focal lengths of each image sensor). The image sensing components of an image sensor 202 may include different types of image sensing components that may provide raw image data in different forms to the ISP 206. For example, in one embodiment, the image sensing components may include a plurality of focus pixels that are used for auto-focusing and a plurality of image pixels that are used for capturing images. In another embodiment, the image sensing pixels may be used for both auto-focusing and image capturing purposes.

ISP 206 implements an image processing pipeline which may include a set of stages that process image information from creation, capture or receipt to output. ISP 206 may include, among other components, sensor interface 302, central control 320, front-end pipeline stages 330, back-end pipeline stages 340, image statistics module 304, vision module 322, back-end interface 342, output interface 316, and auto-focus circuits 350A through 350N (hereinafter collectively referred to as "auto-focus circuits 350" or referred individually as "auto-focus circuits 350"). ISP 206 may include other components not illustrated in FIG. 3 or may omit one or more components illustrated in FIG. 3.

In one or more embodiments, different components of ISP 206 process image data at different rates. In the embodiment of FIG. 3, front-end pipeline stages 330 (e.g., raw processing stage 306 and resample processing stage 308) may process image data at an initial rate. Thus, the various different techniques, adjustments, modifications, or other processing operations performed by these front-end pipeline stages 330 at the initial rate. For example, if the front-end pipeline stages 330 process 2 pixels per clock cycle, then raw processing stage 306 operations (e.g., black level compensation, highlight recovery and defective pixel correction) may process 2 pixels of image data at a time. In contrast, one or more back-end pipeline stages 340 may process image data at a different rate less than the initial data rate. For example, in the embodiment of FIG. 3, back-end pipeline stages 340 (e.g., noise processing stage 310, color processing stage 312, and output rescale 314) may be processed at a reduced rate (e.g., 1 pixel per clock cycle).

Raw image data captured by image sensors 202 may be transmitted to different components of ISP 206 in different manners. In one embodiment, raw image data corresponding to the focus pixels may be sent to the auto-focus circuits 350 while raw image data corresponding to the image pixels may be sent to the sensor interface 302. In another embodiment, raw image data corresponding to both types of pixels may simultaneously be sent to both the auto-focus circuits 350 and the sensor interface 302.

Auto-focus circuits 350 may include hardware circuit that analyzes raw image data to determine an appropriate focal length of each image sensor 202. In one embodiment, the raw image data may include data that is transmitted from image sensing pixels that specializes in image focusing. In another embodiment, raw image data from image capture pixels may also be used for auto-focusing purpose. An auto-focus circuit 350 may perform various image processing operations to generate data that determines the appropriate focal length. The image processing operations may include cropping, binning, image compensation, scaling to generate data that is used for auto-focusing purpose. The auto-focusing data generated by auto-focus circuits 350 may be fed back to the image sensor system 201 to control the focal lengths of the image sensors 202. For example, an image sensor 202 may include a control circuit that analyzes the auto-focusing data to determine a command signal that is sent to an actuator associated with the lens system of the image sensor to change the focal length of the image sensor. The data generated by the auto-focus circuits 350 may also be sent to other components of the ISP 206 for other image processing purposes. For example, some of the data may be sent to image statistics 304 to determine information regarding auto-exposure.

The auto-focus circuits 350 may be individual circuits that are separate from other components such as image statistics 304, sensor interface 302, front-end 330 and back-end 340. This allows the ISP 206 to perform auto-focusing analysis independent of other image processing pipelines. For example, the ISP 206 may analyze raw image data from the image sensor 202A to adjust the focal length of image sensor 202A using the auto-focus circuit 350A while performing downstream image processing of the image data from image sensor 202B simultaneously. In one embodiment, the number of auto-focus circuits 350 may correspond to the number of image sensors 202. In other words, each image sensor 202 may have a corresponding auto-focus circuit that is dedicated to the auto-focusing of the image sensor 202. The device 100 may perform auto focusing for different image sensors 202 even if one or more image sensors 202 are not in active use. This allows a seamless transition between two image sensors 202 when the device 100 switches from one image sensor 202 to another. For example, in one embodiment, a device 100 may include a wide-angle camera and a telephoto camera as a dual back camera system for photo and image processing. The device 100 may display images captured by one of the dual cameras and may switch between the two cameras from time to time. The displayed images may seamless transition from image data captured by one image sensor 202 to image data captured by another image sensor without waiting for the second image sensor 202 to adjust its focal length because two or more auto-focus circuits 350 may continuously provide auto-focus data to the image sensor system 201.

Raw image data captured by different image sensors 202 may also be transmitted to sensor interface 302. Sensor interface 302 receives raw image data from image sensor 202 and processes the raw image data into an image data processable by other stages in the pipeline. Sensor interface 302 may perform various preprocessing operations, such as image cropping, binning or scaling to reduce image data size. In some embodiments, pixels are sent from the image sensor 202 to sensor interface 302 in raster order (e.g., horizontally, line by line). The subsequent processes in the pipeline may also be performed in raster order and the result may also be output in raster order. Although only a single image sensor and a single sensor interface 302 are illustrated in FIG. 3, when more than one image sensor is provided in device 100, a corresponding number of sensor interfaces may be provided in ISP 206 to process raw image data from each image sensor.

Front-end pipeline stages 330 process image data in raw or full-color domains. Front-end pipeline stages 330 may include, but are not limited to, raw processing stage 306 and resample processing stage 308. A raw image data may be in Bayer raw format, for example. In Bayer raw image format, pixel data with values specific to a particular color (instead of all colors) is provided in each pixel. In an image capturing sensor, image data is typically provided in a Bayer pattern. Raw processing stage 306 may process image data in a Bayer raw format.

The operations performed by raw processing stage 306 include, but are not limited, sensor linearization, black level compensation, fixed pattern noise reduction, defective pixel correction, raw noise filtering, lens shading correction, white balance gain, and highlight recovery. Sensor linearization refers to mapping non-linear image data to linear space for other processing. Black level compensation refers to providing digital gain, offset and clip independently for each color component (e.g., Gr, R, B, Gb) of the image data. Fixed pattern noise reduction refers to removing offset fixed pattern noise and gain fixed pattern noise by subtracting a dark frame from an input image and multiplying different gains to pixels. Defective pixel correction refers to detecting defective pixels, and then replacing defective pixel values. Raw noise filtering refers to reducing noise of image data by averaging neighbor pixels that are similar in brightness. Highlight recovery refers to estimating pixel values for those pixels that are clipped (or nearly clipped) from other channels. Lens shading correction refers to applying a gain per pixel to compensate for a dropoff in intensity roughly proportional to a distance from a lens optical center. White balance gain refers to providing digital gains for white balance, offset and clip independently for all color components (e.g., Gr, R, B, Gb in Bayer format). Components of ISP 206 may convert raw image data into image data in full-color domain, and thus, raw processing stage 306 may process image data in the full-color domain in addition to or instead of raw image data.

Resample processing stage 308 performs various operations to convert, resample, or scale image data received from raw processing stage 306. Operations performed by resample processing stage 308 may include, but not limited to, demosaic operation, per-pixel color correction operation, Gamma mapping operation, color space conversion and downscaling or sub-band splitting. Demosaic operation refers to converting or interpolating missing color samples from raw image data (for example, in a Bayer pattern) to output image data into a full-color domain. Demosaic operation may include low pass directional filtering on the interpolated samples to obtain full-color pixels. Per-pixel color correction operation refers to a process of performing color correction on a per-pixel basis using information about relative noise standard deviations of each color channel to correct color without amplifying noise in the image data. Gamma mapping refers to converting image data from input image data values to output data values to perform gamma correction. For the purpose of Gamma mapping, lookup tables (or other structures that index pixel values to another value) for different color components or channels of each pixel (e.g., a separate lookup table for R, G, and B color components) may be used. Color space conversion refers to converting color space of an input image data into a different format. In one embodiment, the resample processing stage 308 converts RGG format into YCbCr format for further processing. In another embodiment, the resample processing state 308 concerts RBD format into RGB format for further processing.

Central control module 320 may control and coordinate overall operation of other components in ISP 206. Central control module 320 performs operations including, but not limited to, monitoring various operating parameters (e.g., logging clock cycles, memory latency, quality of service, and state information), updating or managing control parameters for other components of ISP 206, and interfacing with sensor interface 302 to control the starting and stopping of other components of ISP 206. For example, central control module 320 may update programmable parameters for other components in ISP 206 while the other components are in an idle state. After updating the programmable parameters, central control module 320 may place these components of ISP 206 into a run state to perform one or more operations or tasks. Central control module 320 may also instruct other components of ISP 206 to store image data (e.g., by writing to system memory 230 in FIG. 2) before, during, or after resample processing stage 308. In this way full-resolution image data in raw or full-color domain format may be stored in addition to or instead of processing the image data output from resample processing stage 308 through backend pipeline stages 340.

Image statistics module 304 performs various operations to collect statistic information associated with the image data. The operations for collecting statistics information may include, but not limited to, sensor linearization, replace patterned defective pixels, sub-sample raw image data, detect and replace non-patterned defective pixels, black level compensation, lens shading correction, and inverse black level compensation. After performing one or more of such operations, statistics information such as 3A statistics (Auto white balance (AWB), auto exposure (AE), histograms (e.g., 2D color or component) and any other image data information may be collected or tracked. In some embodiments, certain pixels' values, or areas of pixel values may be excluded from collections of certain statistics data when preceding operations identify clipped pixels. Although only a single statistics module 304 is illustrated in FIG. 3, multiple image statistics modules may be included in ISP 206. For example, each image sensor 202 may correspond to an individual image statistics unit 304. In such embodiments, each statistic module may be programmed by central control module 320 to collect different information for the same or different image data.

Vision module 322 performs various operations to facilitate computer vision operations at CPU 208 such as facial detection in image data. The vision module 322 may perform various operations including pre-processing, global tone-mapping and Gamma correction, vision noise filtering, resizing, keypoint detection, generation of histogram-of-orientation gradients (HOG) and normalized cross correlation (NCC). The pre-processing may include subsampling or binning operation and computation of luminance if the input image data is not in YCrCb format. Global mapping and Gamma correction can be performed on the pre-processed data on luminance image. Vision noise filtering is performed to remove pixel defects and reduce noise present in the image data, and thereby, improve the quality and performance of subsequent computer vision algorithms. Such vision noise filtering may include detecting and fixing dots or defective pixels, and performing bilateral filtering to reduce noise by averaging neighbor pixels of similar brightness. Various vision algorithms use images of different sizes and scales. Resizing of an image is performed, for example, by binning or linear interpolation operation. Keypoints are locations within an image that are surrounded by image patches well suited to matching in other images of the same scene or object. Such keypoints are useful in image alignment, computing camera pose and object tracking. Keypoint detection refers to the process of identifying such keypoints in an image. HOG provides descriptions of image patches for tasks in mage analysis and computer vision. HOG can be generated, for example, by (i) computing horizontal and vertical gradients using a simple difference filter, (ii) computing gradient orientations and magnitudes from the horizontal and vertical gradients, and (iii) binning the gradient orientations. NCC is the process of computing spatial cross-correlation between a patch of image and a kernel.

Back-end interface 342 receives image data from other image sources than image sensor 102 and forwards it to other components of ISP 206 for processing. For example, image data may be received over a network connection and be stored in system memory 230. Back-end interface 342 retrieves the image data stored in system memory 230 and provides it to back-end pipeline stages 340 for processing. One of many operations that are performed by back-end interface 342 is converting the retrieved image data to a format that can be utilized by back-end processing stages 340. For instance, back-end interface 342 may convert RGB, YCbCr 4:2:0, or YCbCr 4:2:2 formatted image data into YCbCr 4:4:4 color format.

Back-end pipeline stages 340 processes image data according to a particular full-color format (e.g., YCbCr 4:4:4 or RGB). In some embodiments, components of the back-end pipeline stages 340 may convert image data to a particular full-color format before further processing. Back-end pipeline stages 340 may include, among other stages, noise processing stage 310 and color processing stage 312. Back-end pipeline stages 340 may include other stages not illustrated in FIG. 3.

Noise processing stage 310 performs various operations to reduce noise in the image data. The operations performed by noise processing stage 310 include, but are not limited to, color space conversion, gamma/de-gamma mapping, temporal filtering, noise filtering, luma sharpening, and chroma noise reduction. The color space conversion may convert an image data from one color space format to another color space format (e.g., RGB format converted to YCbCr format). Gamma/de-gamma operation converts image data from input image data values to output data values to perform gamma correction or reverse gamma correction. Temporal filtering filters noise using a previously filtered image frame to reduce noise. For example, pixel values of a prior image frame are combined with pixel values of a current image frame. Noise filtering may include, for example, spatial noise filtering. Luma sharpening may sharpen luma values of pixel data while chroma suppression may attenuate chroma to gray (e.g., no color). In some embodiment, the luma sharpening and chroma suppression may be performed simultaneously with spatial nose filtering. The aggressiveness of noise filtering may be determined differently for different regions of an image. Spatial noise filtering may be included as part of a temporal loop implementing temporal filtering. For example, a previous image frame may be processed by a temporal filter and a spatial noise filter before being stored as a reference frame for a next image frame to be processed. In other embodiments, spatial noise filtering may not be included as part of the temporal loop for temporal filtering (e.g., the spatial noise filter may be applied to an image frame after it is stored as a reference image frame and thus the reference frame is not spatially filtered).

Color processing stage 312 may perform various operations associated with adjusting color information in the image data. The operations performed in color processing stage 312 include, but are not limited to, local tone mapping, gain/offset/clip, color correction, three-dimensional color lookup, gamma conversion, and color space conversion. Local tone mapping refers to spatially varying local tone curves in order to provide more control when rendering an image. For instance, a two-dimensional grid of tone curves (which may be programmed by the central control module 320) may be bi-linearly interpolated such that smoothly varying tone curves are created across an image. In some embodiments, local tone mapping may also apply spatially varying and intensity varying color correction matrices, which may, for example, be used to make skies bluer while turning down blue in the shadows in an image. Digital gain/offset/clip may be provided for each color channel or component of image data. Color correction may apply a color correction transform matrix to image data. 3D color lookup may utilize a three-dimensional array of color component output values (e.g., R, G, B) to perform advanced tone mapping, color space conversions, and other color transforms. Gamma conversion may be performed, for example, by mapping input image data values to output data values in order to perform gamma correction, tone mapping, or histogram matching. Color space conversion may be implemented to convert image data from one color space to another (e.g., RGB to YCbCr). Other processing techniques may also be performed as part of color processing stage 312 to perform other special image effects, including black and white conversion, sepia tone conversion, negative conversion, or solarize conversion.

Output rescale module 314 may resample, transform and correct distortion on the fly as the ISP 206 processes image data. Output rescale module 314 may compute a fractional input coordinate for each pixel and uses this fractional coordinate to interpolate an output pixel via a polyphase resampling filter. A fractional input coordinate may be produced from a variety of possible transforms of an output coordinate, such as resizing or cropping an image (e.g., via a simple horizontal and vertical scaling transform), rotating and shearing an image (e.g., via non-separable matrix transforms), perspective warping (e.g., via an additional depth transform) and per-pixel perspective divides applied in piecewise in strips to account for changes in image sensor during image data capture (e.g., due to a rolling shutter), and geometric distortion correction (e.g., via computing a radial distance from the optical center in order to index an interpolated radial gain table, and applying a radial perturbance to a coordinate to account for a radial lens distortion).

Output rescale module 314 may apply transforms to image data as it is processed at output rescale module 314. Output rescale module 314 may include horizontal and vertical scaling components. The vertical portion of the design may implement series of image data line buffers to hold the "support" needed by the vertical filter. As ISP 206 may be a streaming device, it may be that only the lines of image data in a finite-length sliding window of lines are available for the filter to use. Once a line has been discarded to make room for a new incoming line, the line may be unavailable. Output rescale module 314 may statistically monitor computed input Y coordinates over previous lines and use it to compute an optimal set of lines to hold in the vertical support window. For each subsequent line, output rescale module may automatically generate a guess as to the center of the vertical support window. In some embodiments, the output rescale module 314 may implement a table of piecewise perspective transforms encoded as digital difference analyzer (DDA) steppers to perform a per-pixel perspective transformation between an input image data and output image data in order to correct artifacts and motion caused by sensor motion during the capture of the image frame. Output rescale may provide image data via output interface 316 to various other components of device 100, as discussed above with regard to FIGS. 1 and 2.

In various embodiments, the functionally of components 302 through 350 may be performed in a different order than the order implied by the order of these functional units in the image processing pipeline illustrated in FIG. 3, or may be performed by different functional components than those illustrated in FIG. 3. Moreover, the various components as described in FIG. 3 may be embodied in various combinations of hardware, firmware or software.

Example Pipeline Associated with Multiple Band Noise Reduction Circuit

Figure 4:
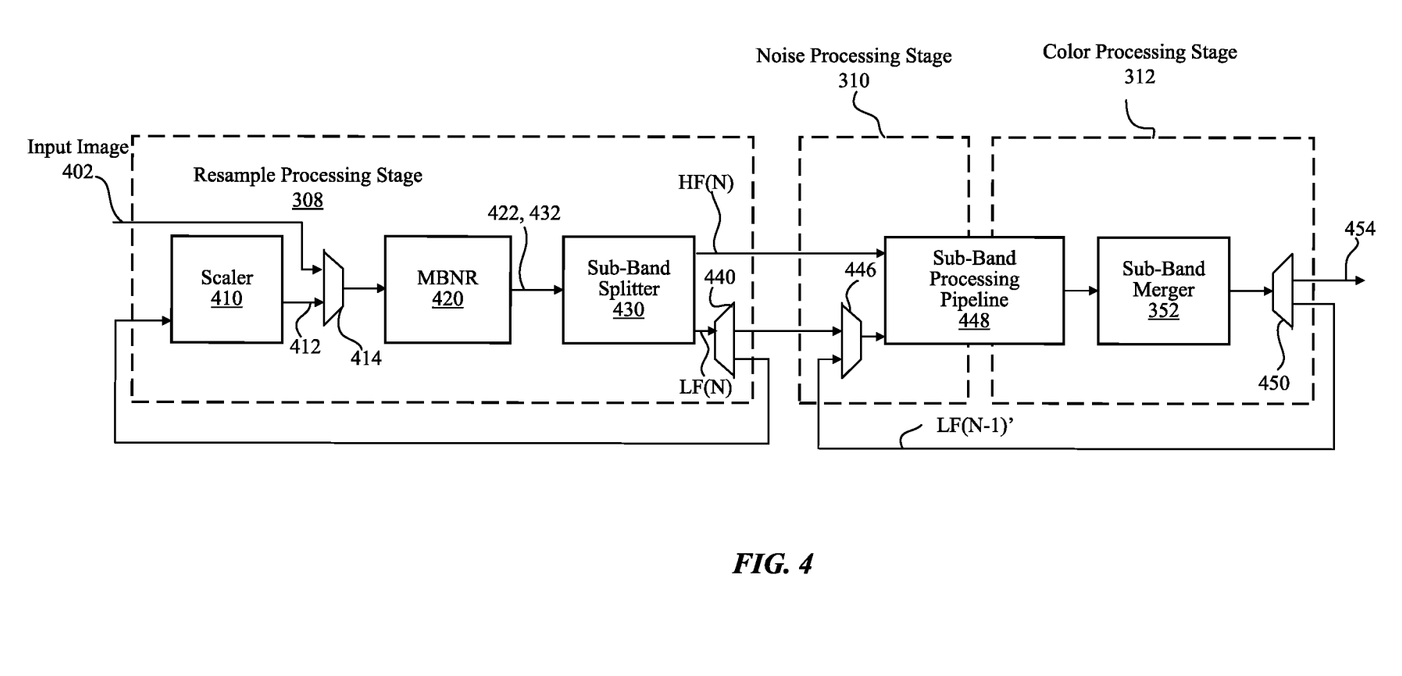
FIG. 4 is a block diagram illustrating a portion of the image processing pipeline including a multiple band noise reduction circuit, according to one embodiment.

FIG. 4 is a block diagram illustrating a portion of the image processing pipeline including a multiple band noise reduction (MBNR) circuit 420, according to one embodiment. In the embodiment of FIG. 4, MBNR circuit 420 is part of a resample processing stage 308 that also includes, among other components, a scaler 410 and a sub-band splitter circuit 430. The resample processing stage 308 performs scaling, noise reduction, and sub-band splitting in a recursive manner.

As a result of recursive processing, the resample processing stage 380 outputs a series of high frequency component image data HF(N) and low frequency component image data LF(N) derived from an original input image 402 where N represents the levels of downsampling performed on the original input image 402. For example, HF(0) and LF(0) represent a high frequency component image data and a low frequency component image data split from the original input image 402, respectively, while HF(1) and LF(1) represent a high frequency component image data and a low frequency component image data split from a first downscaled version of the input image 402, respectively.

MBNR circuit 420 is a circuit that performs noise reduction on multiple bands of the input image 402. The input image 402 is first passed on through a multiplexer 414 to MBNR circuit 420 for noise reduction. The noise reduced version 422 of the original input image 402 is generated by MBNR circuit 420 and fed to a sub-band splitter 430. The sub-band splitter 430 splits the noise reduced 422 version of the original input image 402 into the high frequency component image data HF(0) and the low frequency component image data LF(0). The high frequency component image data HF(0) is passed onto a sub-band processing pipeline 448 and then to a sub-band merger 352. In contrast, the low frequency component image LF(0) is passed through a demultiplexer 440 and is fed back to the resample processing stage 308 for downscaling by a scaler 410.

The scaler 410 generates a downscaled version 412 of the low frequency component image LF(0) fed to the scaler 410, and passes it onto MBNR circuit 420 via the multiplexer 414 for noise reduction. MBNR circuit 420 performs noise reduction to generate a noise reduced version 432 of the downscaled image 412 and sends it to the sub-band splitter 430 to again split the processed low frequency image data LF(0) into the high frequency component image data HF(1) and the low frequency component image data LF(1). The high frequency component image data HF(1) is sent to the sub-band processing pipeline 448 and then the sub-band merger 352 whereas the low frequency component image data LF(1) is again fed back to the scaler 410 to repeat the process within the resample processing stage 308. The process of generating a high frequency component image data HF(N) and a low frequency component image data LF(N) is repeated until the final level of band-splitting is performed by the sub-band splitter 430. When the final level of band-splitting is reached, the low frequency component image data LF(N) is passed through the demultiplexer 440 and a multiplexer 446 to the sub-band processing pipeline 448 and the sub-band merger 352.

As described above, MBNR circuit 420 performs noise reduction on the input image 402 as well as its downscaled low frequency versions of the input image 402. This enables MBNR circuit 420 to perform noise reduction on multiple bands of the original input image 402. It is to be noted, however, that only a single pass of noise reduction may be performed on the input image 402 by MBNR circuit 420 without sub-band splitting and scaling.

The sub-band merger 352 merges processed high frequency component image data HF(N)' and processed low frequency component image data LF(N)' to generate a processed LF(N−1)'. The processed LF(N−1)' is then fed back to the sub-band merger 352 via the demultiplexer 450 and the multiplexer 446 for merging with the processed HF (N−1)' to generate a processed LF(N−2)'. The process of combining the processed high frequency component image data and the processed low frequency component data is repeated until the sub-band merger 352 generates a processed version 454 of input image that is outputted via the demultiplexer 450.

Example Architecture of Multiple Band Noise Reduction Circuit

Figure 5:
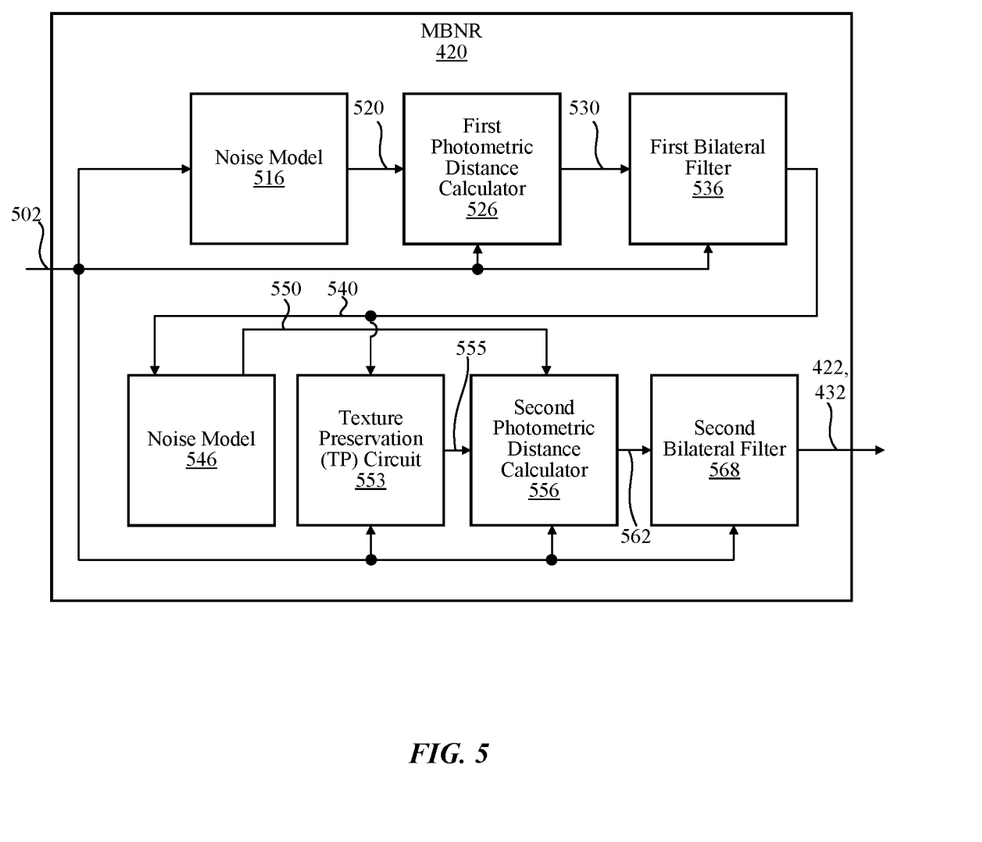
FIG. 5 is a block diagram illustrating a multiple band noise reduction circuit, according to one embodiment.

FIG. 5 is a block diagram illustrating MBNR circuit 420, according to one embodiment. MBNR circuit 420 receives an input image data 502 and generates noise reduced image data 422,432. MBNR circuit 420 may include, among other components, a noise model circuit 516, a first photometric distance calculator circuit 526, a first bilateral filter circuit 536, a noise model circuit 546, a texture preservation (TP) circuit 553, a second photometric distance calculator circuit 556, and a second bilateral filter circuit 568. However, in some embodiments, the MBNR 420 does not include the first photometric distance calculator circuit 526 and the first bilateral filter circuit 536.

The noise model circuit 516 receives the image data 502 and calculates the standard deviation of the noise of the pixel values in the image data 502. The noise standard deviation 520 is then transmitted to the first photometric distance calculator 526.

The first photometric distance calculator circuit 526 computes photometric distances 530 for the neighboring pixels in a block of pixels (e.g., a 3×3 or 5×5 block) from the image date 502. The computed photometric distances may be normalized by the noise standard deviation 520 generated by the noise model circuit 516.

The first bilateral filter 536 calculates bilateral filter coefficients by multiplying photometric coefficients derived from the photometric distances 530 received from the first photometric distance calculator circuit 526 with the corresponding spatial coefficients of the neighboring pixel locations and performs bilateral filtering on the input image data 502 to produce filtered pixel values 540. Instead of using the filtered pixel values 540 of the first bilateral filter 536 as the final result of the MBNR circuit 420, the filtered pixel values 540 are fed to the noise model circuit 546 and subsequent circuits including the second bilateral filter 568 for another iteration of more refined filtering.

The noise model 546 determines the noise standard deviation 550 for the filtered pixel values 540. The noise standard deviation 550 for the filtered pixel values 540 is sent to the second photometric distance calculator 556. In some embodiments, the noise model 516 and the noise model 546 are the same noise model. In some embodiments, the MBNR 420 only has a single noise model that determines both the noise standard deviation 520 and the noise standard deviation 550. For a pixel location, the second bilateral filter can use a second number of neighboring pixels. The second number of neighboring pixels can be the same number of neighboring pixels as the first number of neighboring pixels (used in the first bilateral filter 536) or can be more than the first number of neighboring circuits.

The TP circuit 553 modifies pixel values that are used by the second photometric distance calculator 556 to calculate photometric distances 562. By using the modified pixel values, the second bilateral filter 568 is biased to reduce edge and/or texture blurring of the image data. For this purpose, the TP circuit 553 receives input image data 502. In some embodiments, the TP circuit 553 also receives the filtered pixel values 540 from the first bilateral filter 536. The filtered pixel values 540 may be used as indexing for the lookup table to determine the lower and upper bounds of the offset value (described with respect to FIG. 6). Alternatively, the original center pixel from the image data 502 is used to index the lookup table. For a block of pixels (e.g., 3×3 or 5×5 pixels) that includes a center pixel value and neighboring pixel values, the TP circuit 553 determines a modified center pixel value 555 of the block, and transmits the modified pixel value 555 to the second photometric distance calculator 556. The modified pixel value 555 and the TP circuit 553 are further described with reference to FIG. 6.

The second photometric distance calculator circuit 556 computes photometric distances 562 based on the modified center pixel value 555 generated by the TP circuit 553 and the neighboring pixel values (e.g., received from the image data 502). Specifically, the second photometric distance calculator circuit 556 computes photometric distances 562 for the neighboring pixels of the block where the original center pixel value of the block is interchanged with the modified pixel value 555 (the block with the modified pixel value 555 may be referred to as a modified pixel block). Other than the use of the modified pixel value 555 instead of the original center pixel value, the second photometric distance calculator circuit 556 performs in a similar way as the first photometric distance calculator circuit 526 to generate photometric distances 562.

The second bilateral filter 568 performs the bilateral filtering on a pixel in the input image data 502 (not modified by the TP circuit 553) using the photometric distances 562. Specifically, the second bilateral filter 568 obtains a tap for a pixel location by multiplying a photometric coefficient derived from the photometric distance for the pixel location with a corresponding spatial coefficient of the pixel location. After obtaining taps for each pixel location of the neighboring pixels in the block surrounding the center pixel to be bilaterally filtered, the second bilateral filter 568 multiplies a pixel value with a corresponding tap, and adds the multiplied values to obtain the bilaterally filtered version of the center pixel. The second bilateral filter 568 outputs, as the output of the MBNR circuit 420, the noise reduced image data 422.

Although the embodiment of FIG. 5 shows the filtering the raw image data in two stages, three or more stages of bilateral filtering based on gradually finer noise models may be performed to generate the noise reduced version of the raw image data. Alternatively, only a single stage of bilateral filtering may also be performed.

Example Texture Preservation Circuit

Figure 6:
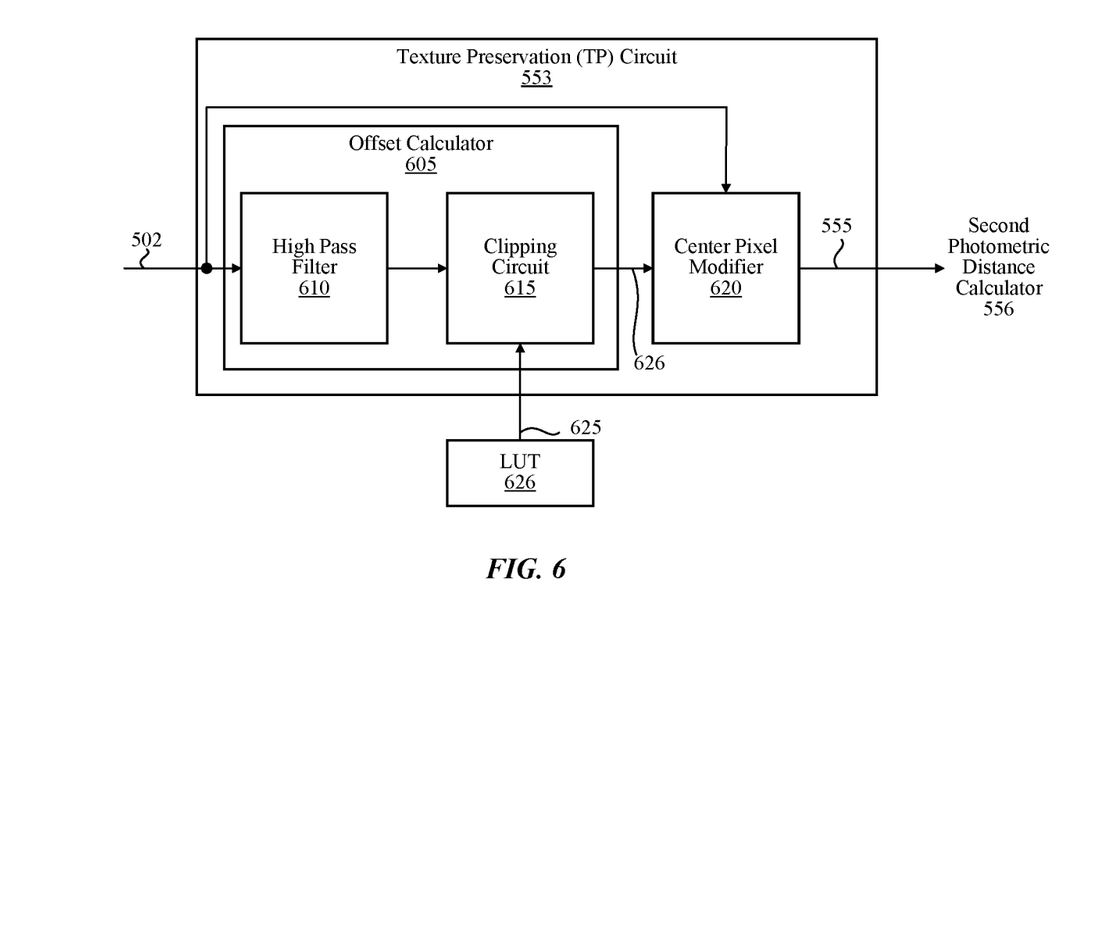
FIG. 6 is a block diagram illustrating components of a texture preservation circuit, according to one embodiment.

FIG. 6 is a block diagram illustrating components of a texture preservation (TP) circuit 553, according to one embodiment. The TP circuit 553 may include, among other components, an offset calculator circuit 605, a center pixel modifier circuit 620. The offset calculator circuit 605 includes a high pass filter circuit 610 and a clipping circuit 615.

The TP circuit 553 receives a block of pixels (e.g., a 3×3 or 5×5 block) in the input image data 502 as original pixels, and processes the block of pixels to generate a modified version of the center pixel of the block. In some embodiments, the original pixels are luminance values and in some embodiments the original pixels are red, blue, and green values. The block of pixels includes the center pixel and neighboring pixels that surround the pixel in the image data.

The offset calculator circuit 605 determines an offset value 626 for the center pixel of the block of pixels based on the received block of pixels. The offset value is used to modify the center pixel value of the block of pixels. The high pass filter circuit 610 applies a high pass filter to the block of pixels. Specifically, a high pass filter is applied by convoluting a high pass filter kernel with the block of pixel values. The high pass filter may be a Laplacian high pass filter or a Laplacian of Gaussian high pass filter. Applying the high pass filter to the block of pixel values produces an offset value 626.

The clipping circuit 615 ensures that the offset value does not exceed an upper or lower bound by clipping the offset value if it exceeds the upper or lower bound. If the offset value is larger than the upper bound, the offset value is set to the upper bound value, and similarly, if the offset value is smaller than the lower bound, the offset value is set to the lower bound value. The clipping circuit 615 may receive the upper and lower bounds 625 from a look up table 626 (e.g., based on the center pixel value). Entries in the look up table may be determined by the CPU 208 based on characteristics of the image data and the image sensor 202 that captured the image data.

The center pixel modifier circuit 620 receives an offset value 626 from the offset calculator circuit 605 and the center pixel of the block of pixels. The center pixel modifier circuit 620 adjusts the center pixel of the block by the offset value to generate a modified center pixel value 555. For example, the center pixel modifier circuit 620 adds the offset value to the center pixel value. In some embodiments, the center pixel modifier circuit 620 includes a second clipping circuit (not shown in FIG. 6) similar to the clipping circuit 615 to ensure that the modified center pixel value does not exceed the upper or lower bound.

Example Method of Filtering with Texture Preservation

Figure 7:
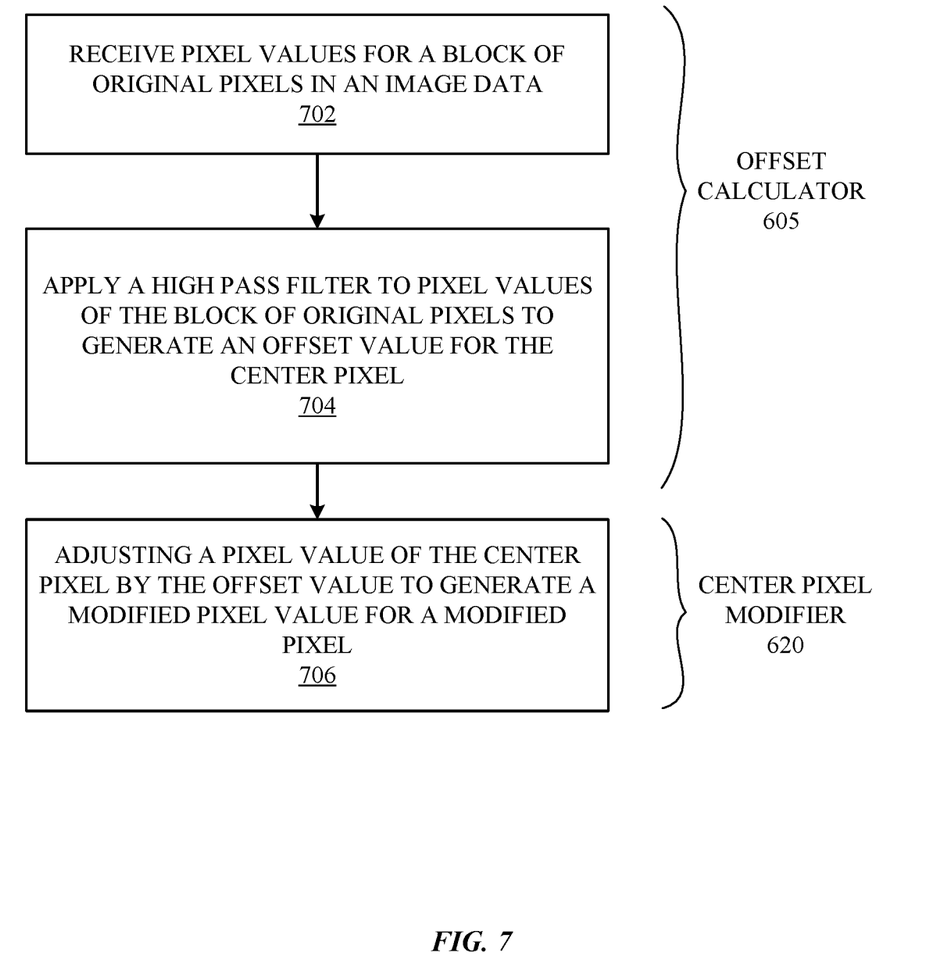
FIG. 7 is a flowchart illustrating a method of biasing an image noise filter to reduce edge and texture blurring of image data, according to one embodiment.

FIG. 7 is a flowchart illustrating a method of biasing an image noise filter to reduce edge and texture blurring of image data, according to one embodiment. The steps of the method may be performed in different orders, and the method may include different, additional, or fewer steps.

An offset calculator circuit receives 702 pixel values for a block of original pixels in an image data. The block of original pixels comprises a center pixel and neighboring pixels within a predetermined distance from the center pixel. The block of original pixels may be a 5×5 block of pixels. In some embodiments, the block of original pixels is a 3×3 block of pixels.

The offset calculator circuit applies 704 a high pass filter to pixel values of the block of original pixels to generate an offset value for the center pixel. The high pass filter may be a Laplacian high pass filter or a Laplacian of Gaussian high pass filter. The offset value may be clipped to a first value if the offset value is above the first value and clipped to a second value if the offset value is below the second value.

A center pixel modifier circuit adjusts 706 a pixel value of the center pixel by the offset value to generate a modified pixel value for the center pixel. The modified pixel is then used to determine photometric distances for a bilateral filter. By using such photometric distances derived from the modified center pixel value, edges and/or texture in the image data can be better preserved after performing the bilateral filtering.

The modified center pixel value and the neighboring pixels form a modified pixel block. A photometric distance calculator circuit may determine photometric coefficients by calculating photometric distances of pixel values in the modified pixel block.

A bilateral filter may perform bilateral filtering by at least multiplying one of the coefficients derived from the photometric distances, a corresponding spatial coefficient of the block of original pixels, and a pixel value of a corresponding pixel in the block of original pixels.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

The invention claimed is:

1. An image processor comprising:
an offset calculator circuit configured to:
receive pixel values for a block of original pixels in image data, the block of original pixels comprising a center pixel and neighboring pixels within a predetermined distance from the center pixel, and
apply a high pass filter to pixel values of the block of original pixels to generate an offset value for the center pixel;
a center pixel modifier circuit coupled to the offset calculator circuit and configured to adjust a pixel value of the center pixel by the offset value to generate a modified pixel value for a modified pixel that becomes part of a modified pixel block, the modified pixel block comprising the modified pixel value and the neighboring pixel values; and
a photometric distance calculator circuit coupled to a pixel block assembler circuit to receive the modified pixel block, the photometric distance calculator circuit configured to determine photometric distances of pixel values in the modified pixel block and determine photometric coefficients by processing the photometric distances for generating a bilateral filter that preserves texture in the image data.

2. The image processor of claim 1, further comprising:
the pixel block assembler circuit coupled to the center pixel modifier circuit to receive the modified pixel value, the pixel block assembler circuit configured to assemble the modified pixel block by including at least the modified pixel value as a pixel value for one of the pixels in the block of modified pixels.

3. The image processor of claim 2, wherein the image processor further comprises a bilateral filter circuit coupled to the photometric distance calculator circuit and configured to perform bilateral filtering by at least multiplying one of the photometric coefficients, a corresponding spatial coefficient of the block of original pixels, and a pixel value of a corresponding pixel in the block of original pixels.

4. The image processor of claim 1, wherein the offset calculator circuit comprises a clipping circuit configured to set the offset value as a first value if the offset value is above the first value and set the offset value as a second value if the offset value is below the second value.

5. The image processor of claim 4, wherein the first value and the second value are programmed into a look up table.

6. The image processor of claim 1, wherein the block of original pixels is a 5×5 block of pixels.

7. The image processor of claim 1, wherein the high pass filter is a Laplacian high pass filter.

8. The image processor of claim 1, wherein the high pass filter is a Laplacian of Gaussian high pass filter.

9. The image processor of claim 1, wherein the image data is luminance image data.

10. The image processor of claim 1, wherein the image data is one of red, blue, or green image data.

11. A method comprising:
receiving, by an offset calculator circuit, pixel values for a block of original pixels in image data, the block of original pixels comprising a center pixel and neighboring pixels within a predetermined distance from the center pixel;
applying, by the offset calculator circuit, a high pass filter to pixel values of the block of original pixels to generate an offset value for the center pixel;
adjusting, by a center pixel modifier circuit coupled to the offset calculator, a pixel value of the center pixel by the offset value to generate a modified pixel value for a modified pixel that becomes part of a modified pixel block, the modified pixel block comprising the modified pixel value and the neighboring pixel values;
determining, by a photometric distance calculator circuit, photometric distances of pixel values in the modified pixel block; and
determining, by the photometric distance calculator circuit, photometric coefficients by processing the photometric distances.

12. The method of claim 11, further comprising:
assembling the block of modified pixels by including at least the modified pixel value as a pixel value for one of pixels in the block of modified pixels.

13. The method of claim 12 further comprising:
performing, by a bilateral filter circuit coupled to the photometric distance calculator circuit, bilateral filtering by at least multiplying one of the photometric coefficients, a corresponding spatial coefficient of the block of original pixels, and a pixel value of a corresponding pixel in the block of original pixels.

14. The method of claim 11, wherein the offset calculator circuit comprises a clipping circuit configured to set the offset value as a first value if the offset value is above the first value and set the offset value as a second value if the offset value is below the second value.

15. The method of claim 14, wherein the high pass filer is a Laplacian high pass filter or a Laplacian of Gaussian high pass filter.

16. A system comprising:
an image sensor configured to capture image data;
an image processor comprising:
   an offset calculator circuit configured to:
      receive pixel values for a block of original pixels in a version of the captured image data, the block of original pixels comprising a center pixel and neighboring pixels within a predetermined distance from the center pixel, and
      apply a high pass filter to pixel values of the block of original pixels to generate an offset value for the center pixel;
   a center pixel modifier circuit coupled to the offset calculator and configured to adjust a pixel value of the center pixel by the offset value to generate a modified pixel value for a modified pixel that becomes part of a modified pixel block, the modified pixel block comprising the modified pixel value and the neighboring pixel values; and
   a photometric distance calculator circuit coupled to a pixel block assembler circuit to receive the modified pixel block, the photometric distance calculator configured to determine photometric distances of pixel values in the modified pixel block and determine photometric coefficients by processing the photometric distances.

17. The system of claim 16, wherein the image processor further comprises:
   the pixel block assembler circuit coupled to the center pixel modifier to receive the modified pixel value, the pixel block assembler circuit configured to assemble the block of modified pixels by including at least the modified pixel value as a pixel value for one of the pixels in the block of modified pixels.

18. The system of claim 17, wherein the image processor further comprises:
   a bilateral filter circuit coupled to the photometric distance calculator circuit and configured to perform bilateral filtering by at least multiplying one of the photometric coefficients, a corresponding spatial coefficient of the block of original pixels, and a pixel value of a corresponding pixel in the block of original pixels.

19. The system of claim 16, wherein the offset calculator circuit comprises a clipping circuit configured to set the offset value as a first value if the offset value is above the first value and set the offset value as a second value if the offset value is below the second value.

20. The system of claim 16, wherein the high pass filter is a Laplacian high pass filter or a Laplacian of Gaussian high pass filter.

* * * * *

UNITED STATES PATENT AND TRADEMARK OFFICE
CERTIFICATE OF CORRECTION

PATENT NO. : 11,074,678 B2
APPLICATION NO. : 16/393892
DATED : July 27, 2021
INVENTOR(S) : Sheng Lin et al.

Page 1 of 1

It is certified that error appears in the above-identified patent and that said Letters Patent is hereby corrected as shown below:

In the Claims

Column 18, Claim 15, Line 65: delete "The method of claim 14, wherein the high pass filer is" and insert --The method of claim 14, wherein the high pass filter is--.

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*